(12) United States Patent
Forey et al.

(10) Patent No.: US 10,789,768 B2
(45) Date of Patent: Sep. 29, 2020

(54) FORWARD KILLING OF THREADS CORRESPONDING TO GRAPHICS FRAGMENTS OBSCURED BY LATER GRAPHICS FRAGMENTS

(71) Applicant: ARM Limited, Cambridge (GB)

(72) Inventors: Stephane Forey, Cambridge (GB); Jørn Nystad, Trondheim (NO); Reimar Gisbert Döffinger, Lund (SE); Kenneth Edvard Østby, Cambridge (GB); Toni Viki Brkic, Staffanstorp (SE)

(73) Assignee: ARM Limited, Cambridge (GB)

( * ) Notice: Subject to any disclaimer, the term of this patent is extended or adjusted under 35 U.S.C. 154(b) by 2 days.

(21) Appl. No.: 16/128,807

(22) Filed: Sep. 12, 2018

(65) Prior Publication Data
US 2019/0088009 A1     Mar. 21, 2019

(30) Foreign Application Priority Data

Sep. 15, 2017 (GB) .................................. 1714836.2

(51) Int. Cl.
| | |
|---|---|
| *G06T 15/40* | (2011.01) |
| *G06T 15/00* | (2011.01) |
| *G06F 9/48* | (2006.01) |
| *G06T 15/80* | (2011.01) |

(52) U.S. Cl.
CPC ............ *G06T 15/405* (2013.01); *G06F 9/485* (2013.01); *G06F 9/4881* (2013.01); *G06T 15/005* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 2012/0304194 A1* | 11/2012 | Engh-Halstevdt | G06F 9/4881 718/106 |
| 2014/0354654 A1 | 12/2014 | Heggelund et al. | |
| 2015/0130802 A1 | 5/2015 | Devereux et al. | |
| 2016/0247249 A1* | 8/2016 | Harris | G06T 11/40 |

OTHER PUBLICATIONS

Combined Search and Examination Report for GB1714836.2 dated Feb. 26, 2018, 5 pages.

* cited by examiner

*Primary Examiner* — Tize Ma
(74) *Attorney, Agent, or Firm* — Nixon & Vanderhye, P.C.

(57) ABSTRACT

A graphics processing apparatus comprises fragment generating circuitry to generate graphics fragments corresponding to graphics primitives, thread processing circuitry to perform threads of processing corresponding to the fragments, and forward kill circuitry to trigger a forward kill operation to prevent further processing of a target thread of processing corresponding to an earlier graphics fragment when the forward kill operation is enabled for the target thread and the earlier graphics fragment is determined to be obscured by one or more later graphics fragments. The thread processing circuitry supports enabling of the forward kill operation for a thread including at least one forward kill blocking instruction having a property indicative that the forward kill operation should be disabled for the given thread, when the thread processing circuitry has not yet reached a portion of the thread including the at least one forward kill blocking instruction.

16 Claims, 10 Drawing Sheets

| cycle | warp PC (82) | instruction at gPC | tPC0 (84) | thread 0 operation 0 | tPC1 (84) | thread 1 operation 1 | tPC2 (84) | thread 2 operation 2 | tPC3 (84) | thread 3 operation 3 |
|---|---|---|---|---|---|---|---|---|---|---|
| 0 | #add | ADD r2,r3,r4 | #add | 2+2=4 | #add | 1+9=10 | #add | -3+22=19 | #add | 2 + 8 = 10 |
| 1 | #add+4 | CMP r2,#19 | #add+4 | NE | #add+4 | NE | #add+4 | EQ | #add+4 | NE |
| 2 | #add+8 | BNE #add+16 | #add+8 Y → tPC0=#add+16 | | #add+8 Y → tPC1=#add+16 | | #add+8 N → tPC2=#add+12 | | #add+8 Y → tPC3=#add+16 | |
| 3 | #add+12 | MUL r5,r6,r7 | #add+16 | — | #add+16 | — | #add+12 | 3x12=36 | #add+16 | — |
| 4 | #add+16 | STR r2,base+index | #add+16 | index=0 | #add+16 | index=1 | #add+16 | index=2 | #add+16 | index=3 |

FIG. 8

```
clause m {  .
             .
             .
   130 ─╱ FPK - Block - Start
             .
             .
             .
          side effect generating instruction
             .
             .
             .
        } clause n {  .
            . side effect generating
            .       instruction
            .
   132 ─╱ FPK - Block - End
             .
             .
             .
        }
```

FIG. 10

FORWARD KILLING OF THREADS CORRESPONDING TO GRAPHICS FRAGMENTS OBSCURED BY LATER GRAPHICS FRAGMENTS

This application claims priority to GB Patent Application No. 1714836.2 filed Sep. 15, 2017, the entire contents of which are hereby incorporated by reference.

The present technique relates to the field of graphics processing.

It is known that some aspects of graphics processing are computationally intensive tasks. For example, in a graphics processing system which receives graphics primitives, performs rasterization operations on those primitives to generate graphics fragments, and then performs rendering (shading) operations on those graphics fragments, the latter rendering (shading) operations are known to be particularly computationally intensive. For this reason, it is further known to seek to identify as early as possible in a graphics pipeline any graphics fragments which will not appear in the final display because they are overdrawn by other graphics fragments. If such hidden graphics fragments can be identified early in the graphics processing, in particular before the shading operations are carried out, then significant unnecessary processing can be avoided.

At least some examples provide an apparatus for processing graphics primitives for display, comprising:

fragment generating circuitry to generate graphics fragments corresponding to the graphics primitives;

thread processing circuitry to perform threads of processing corresponding to the graphics fragments; and forward kill circuitry to trigger a forward kill operation to prevent the thread processing circuitry performing further processing of a target thread of processing corresponding to an earlier graphics fragment when the forward kill operation is enabled for the target thread and the earlier graphics fragment is determined to be obscured in said display by one or more later graphics fragments;

wherein the thread processing circuitry is configured to enable the forward kill operation for a given thread including at least one forward kill blocking instruction having a property indicative that the forward kill operation should be disabled for the given thread, when said thread processing circuitry has not yet reached a portion of the given thread including said at least one forward kill blocking instruction.

At least some examples provide an apparatus for processing graphics primitives for display, comprising:

means for generating graphics fragments corresponding to the graphics primitives;

means for processing threads of processing corresponding to the graphics fragments, and means for triggering a forward kill operation to prevent the means for processing performing further processing of a target thread of processing corresponding to an earlier graphics fragment when the forward kill operation is enabled for the target thread and the earlier graphics fragment is determined to be obscured by one or more later graphics fragments, wherein the means for processing is configured to enable the forward kill operation for a given thread including at least one forward kill blocking instruction having a property indicative that the forward kill operation should be disabled for the given thread, when said means for processing has not yet reached a portion of the given thread including said at least one forward kill blocking instruction.

At least some examples provide a method for processing graphics primitives for display, comprising:

generating graphics fragments corresponding to the graphics primitives; and performing threads of processing corresponding to the graphics fragments; and triggering a forward kill operation to prevent further processing of a target thread of processing corresponding to an earlier graphics fragment when the forward kill operation is enabled for the target thread and the earlier graphics fragment is determined to be obscured by one or more later graphics fragments; and enabling the forward kill operation for a given thread including at least one forward kill blocking instruction having a property indicative that the forward kill operation should be disabled for the given thread, when processing of the given thread has not yet reached a portion of the given thread including said at least one forward kill blocking instruction.

Further aspects, features and advantages of the present technique will be apparent from the following description of examples, which is to be read in conjunction with the accompanying drawings, in which:

FIG. 1 schematically illustrates an example of a graphics processing pipeline for processing of graphics primitives for display;

FIG. 8 illustrates an example of execution of multiple threads in a warp controlled by group program counter;

FIG. 10 shows an alternative where forward kill blocking start and end instructions are used to mark the portion of program code which requires blocking of the forward kill operation.

Figure 1:
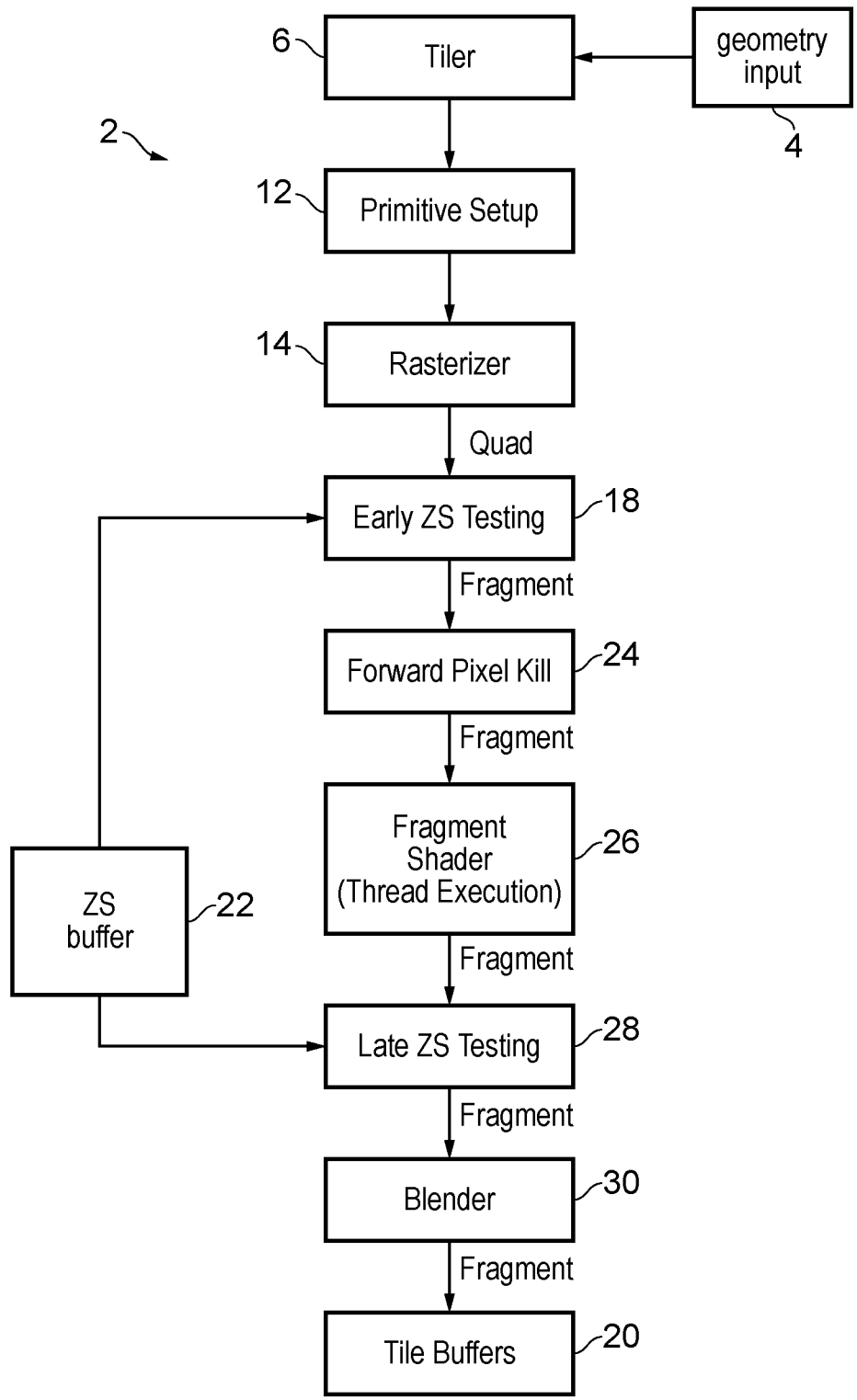

A graphics processing pipeline may have a depth testing stage for checking whether a depth associated with a fragment to be drawn is such that the fragment would be obscured by an earlier received fragment which has already been drawn. For example a Z stencil buffer may be maintained specifying, for each pixel of a rendered frame or tile, the current depth of the front-most pixel drawn to the tile or frame buffer so far. When receiving fragments at a later time, the depth of the new fragments can then be compared with the current depth in the corresponding location of the Z stencil buffer and then processing of the later fragment can be cancelled if that fragment would be completely obscured by already drawn fragments. This approach works well in cases where the fragments are ordered so that the front-most fragments are received first, before fragments corresponding to objects further away from the newer of the rendered scene. However, in practice sorting the fragments so that they are presented to the pipeline in order of depth from front to back can be computationally expensive and difficult to implement efficiently. Also, sorting the fragments from front to back would make it difficult to render scenes including transparent objects where objects closer to the front of the scene need to be blended with objects behind them. In cases where there are transparent objects then it is often better to render the rear-most fragments before the front-most fragments.

Hence, an apparatus for processing graphics primitives may have forward kill circuitry for triggering a forward kill operation for preventing further processing of a target thread of processing corresponding to an earlier graphics fragment when the earlier graphics fragment is determined to be obscured in the display by one or more later graphics fragments. The forward kill circuitry may exploit the fact that the graphics pipeline has a certain depth and so at the point when a later graphics fragment is received, processing of an earlier graphics fragment may still be ongoing, and so it is still possible to prevent at least some processing of the earlier graphics fragment when it will be obscured by the later fragment. Effectively, this allows a certain degree of "seeing into the future" since it enables some processing of certain graphics fragments to be omitted if it is known that a later received fragment will obscure it in the final display. This saves computational resource and improves performance.

However, some threads of processing may include instructions which have a property indicating that the forward kill operation should be disabled for a given thread of processing applied to a given graphics fragment. For example, some threads may include instructions which generate side effects which should be allowed to complete even if the corresponding graphics fragment ends up not contributing to the final rendered display. The precise nature of the side effects may vary from implementation to implementation or from instruction to instruction, but could include operations such as image stores to store part of the image to memory, atomic operations which atomically update a location in memory (e.g. atomic counter increments), or operations involving buffer variables. Hence in general a thread of processing may include at least one forward kill blocking instruction which has a property indicating that it is preferable not to kill the corresponding thread even if the corresponding graphics fragment is obscured by another graphics fragment.

One approach for handling threads including such a forward kill blocking instruction may be to disable the forward kill operation for the entire thread. For example a thread may have a parameter in a thread descriptor which may block performance of the forward kill operation for that thread. If the thread specifies the blocking parameter, the thread may be allowed to complete regardless of whether the forward kill circuitry detects that a later graphics fragment would obscure the earlier graphics fragment being processed by that thread.

However, the inventors recognised that often in practice the reason why certain operations are treated as forward kill blocking instructions is not that such operations must be carried out per se, but that there is typically a set of operations which should either be performed in their entirety or should not be performed at all. Hence, it may be that it is the partial completion of a set of forward kill blocking instructions which should be avoided, rather than the omission of a forward kill blocking instruction per se. Hence, even if a thread includes at least one forward kill blocking instruction, it may be acceptable to allow the forward kill operation to terminate that thread provided that processing of the thread by the thread processing circuitry has not yet reached a portion of the thread that includes the at least one forward kill blocking instruction. Hence, during a window from the start of the thread to the portion including the at least one forward kill blocking instruction, the thread processing circuitry may enable the forward kill operation so that if the forward kill circuitry detects that the fragment being processed by that thread will be obscured by a later received graphics fragment then it is still possible to terminate the given thread comprising the forward kill blocking instruction. This provides additional opportunities to suppress processing of fragments which do not contribute to the visible display, allowing further improvements in performance by avoiding expending processing resources on processing which does not influence the rendered frame.

The thread processing circuitry may have the capability to change whether the forward kill operation is enabled or disabled for a given thread at an intermediate point of the processing of that thread. Hence, thread processing circuitry may trigger disabling of the forward kill operation for the given thread in response to the thread processing circuitry reaching the portion of the given thread that includes the at least one forward kill blocking instruction. Hence, for at least some threads the thread processing circuitry may initially enable the forward kill operation on starting processing of the given thread, but then disable to forward kill operation when the portion including at least one forward kill blocking instruction is reached.

In some cases, once the forward kill operation is disabled because at least one forward kill blocking instruction is present, the forward kill operation may then remain disabled for the remainder of the given target thread. This may be more efficient to implement by avoiding any overhead in detecting when the final forward kill blocking instruction of the thread is encountered.

However, in other examples the thread processing circuitry may trigger re-enabling of the forward kill operation for the given target thread in response to the given target thread progressing beyond a portion of the given target thread including a final forward kill blocking instruction of the given target thread. Hence, while the forward kill operation may be disabled during the portion of the thread which includes one or more forward kill blocking instructions, once that portion has been completed then it can be useful to re-enable the forward kill operation to allow further processing of the thread to be terminated if it is determined that the corresponding graphics fragment is obscured by a later received graphics fragment. The inventors recognised that often there may be relatively few forward kill blocking instructions which are in a relatively small portion of the given thread, and then subsequently there may be ongoing processing which does not involve any forward kill blocking instructions. Hence, there is an opportunity for improved performance by re-enabling the forward kill operation once the final forward kill blocking instruction has been executed.

There are a number of ways in which the thread processing circuitry may detect portions of a given thread which include at least one forward kill blocking instruction. In some cases, the thread processing circuitry may be able to identify the forward kill blocking instructions based on their instruction encoding. For example certain classes of instruction may be considered forward kill blocking and so when such an instruction is detected then the thread processing circuitry could automatically disable the forward kill operation, without requiring any explicit annotation by a compiler. This approach could work well for certain types of instructions such as atomic load/store operations which are usually used in a manner such that a set of atomic operations should be performed in their entirety or not at all. Hence for example the thread processing circuitry may have instruction decoding circuitry which identifies whether a given instruction is a forward kill blocking instruction, and hence when the first forward kill blocking instruction is identified, the forward kill operation is disabled and so any subsequent request from the forward kill circuitry to trigger a forward kill operation may be rejected.

However, there are some types of instruction which may sometimes be used in a manner requiring blocking of a forward kill operation but could otherwise be used in a different manner so that forward kill operations would not cause a problem. For example, load/store instructions could sometimes be used to access or update data within a storage structure or memory which once updated should be allowed to complete the processing using that data structure, and so such load/store instructions may be treated as forward kill blocking instructions. However, the same type of load/store instruction could also be used for systems where a thread requires a greater working set of data than can fit within the available physical registers provided for the thread processing circuitry, and in this case the load/store instructions may be used to spill register contents to memory and fill the registers using values previously spilled to memory, and such operations would not normally cause a concern for allowing forward kill operations. Therefore, in some cases it may not be possible to detect from the instruction encoding alone whether a given operation should be considered a forward kill blocking instruction. In some systems, the decoder could as a precaution simply treat all instructions which could generate a side effect as a forward kill blocking instruction, regardless of whether the usage of that instruction is actually generating such a side effect. However, this may reduce performance by unnecessarily suppressing the forward kill operation for instructions which do not need the forward kill operation to be suppressed.

Hence, in other examples the thread processing circuitry may detect portions of code including forward kill blocking instructions based on information provided by a compiler which compiles the program instructions corresponding to a given thread of execution.

In one example, each portion of program code may be annotated by the compiler with a forward kill enable parameter, which specifies whether the forward kill operation should be enabled or disabled for that portion of the thread. Hence, in response to the thread processing circuitry reaching a given portion of the given thread, the thread processing circuitry may detect a forward kill enable parameter specified for that given portion and use this to control whether the forward kill operation is enabled or disabled for the given thread. By allowing the compiler to specify at the granularity of portions of the thread (rather than individual instructions), this reduces the overhead of enabling and disabling forward kill operations within a thread. In one example the forward kill enable parameter could be specified in a portion header which provides control information for controlling execution of instructions in a following portion of the given thread subsequent to the portion header. Alternatively, the forward kill enable parameter for each portion could be specified in a separate data file from the program code itself. Hence, in practice if there are a given number of portions which include forward kill blocking instructions, the compiler may ensure that the forward kill enable parameter specified for each of the portions between the first portion including a forward kill blocking instruction and the last portion including a forward kill blocking instruction are set to disable forward kill operations, but may generate the portions outside that region with a forward kill enable parameter which enables forward kill operations for the portions before the first forward kill blocking instruction and after the last forward kill blocking instruction.

To track whether the forward kill operation is enabled for a given thread, the thread processing circuitry may maintain a thread forward kill enable status value indicating whether the forward kill operation is enabled or disabled for the given thread. When a given portion of the given thread is reached, the thread processing circuitry may set the thread forward kill enable status value for the thread as a whole to a value dependent on a value of the forward kill enable parameter specified for the reached portion of the thread. For example, on entering each respective portion of the thread, the value of the forward kill enable parameter for that specific portion may be copied to the thread forward kill enable status value (or the thread forward kill enable status value may be an inverted version of the forward kill enable parameter), to update whether the forward kill operation is currently enabled or disabled for the thread.

Another approach for signalling to the thread processing circuitry that regions of code including forward kill blocking instructions are about to start or have finished may be to provide a dedicated forward kill blocking start instruction and/or forward kill blocking end instruction. The forward kill blocking start instruction may have a specific encoding signalling to the thread processing circuitry that it should now detect that the given thread has reached the portion including the forward kill blocking instruction. Hence the forward kill blocking start instruction can be included by a compiler just before any operations which require forwards kill operations to be blocked, to trigger the thread processing circuitry to disable the forward kill operation. Similarly, a forward kill blocking end instruction can be included after the final forward kill blocking instruction to signal that it is safe to re-enable forward kill operations. It is not essential to provide both types of instruction. For example, in some instruction set architectures it may be preferred to only provide the forward kill blocking start instruction to avoid the encoding overhead of the forward kill blocking end instruction. In other architectures where there is sufficient encoding space, the forward kill blocking end instruction could be included as well to increase the opportunity for enabling forward kill operations after the final forward kill blocking instruction of the thread.

In some examples the enabling and disabling of the forward kill operation for a given thread may be performed at the granularity of individual threads, so that each thread may independently have the forward kill operation enabled or disabled. For example separate global forward kill enable status values may be provided for each thread.

However, in practice the precise control at the level of individual threads may not always be required and it may be more efficient to share the control of enabling and disabling of the forward kill operation between a group of threads. In this case, the forward kill operation may either be enabled for each of the threads in the same thread group or may be disabled for each of the threads in the same thread group, but the thread processing circuitry may not support individually setting the enable or disable status separately for each of the threads in the group. A second thread group may have a different enable/disable status for the forward kill operation compared to a first thread group.

In this case, the thread processing circuitry may trigger disabling of the forward kill operation for each of the threads of a target thread group when any of the threads of the target thread group reaches a portion of the thread including a forward kill blocking instruction. Hence, even if some of the threads do not actually execute a forward kill blocking instruction they may still have their forward kill operation disabled because the enabling and disabling for a group of threads is performed in common using a common control parameter.

This approach of controlling the enable/disable status for threads in groups may be particularly useful in graphics pipelines which use single instruction multiple thread (SIMT) processing. It is relatively common that nearby pixels in a frame to be rendered will have similar values, and so the path taken through the program code for neighbouring pixels tends to be similar (e.g. similar branches may be taken at various branch points within the program). This means that often the same instructions may need to be executed by each of the threads corresponding to nearby graphics fragments or pixels. Therefore, to reduce the overhead of fetching and decoding instructions, it is possible to process a number of threads in a thread group in dependence on a group program counter which is shared between the threads of the thread group, so that the next instruction to be executed by the thread group in each cycle is controlled based on the group program counter. With this approach, while it is possible for the threads paths through the program to diverge at certain branches, in this case some of the threads may be idle for some cycles while other threads execute other instructions since only a single fetch and decode mechanism may be provided to fetch a single instruction per thread group per cycle.

Hence, in a SIMT-based embodiment, even if one of the threads of a given thread group corresponds to a fragment which the forward kill circuitry determines will be obscured by a later received graphics fragment, it may not be worth killing that thread because in practice the other threads of the same thread group may need to continue. Given the limitation of controlling instruction fetching for a group of threads with a common group program counter, it would not be possible to allocate a different thread to the lane used for the thread which is the target of the forward kill operation. Hence, in practice when SIMT-based processing is used, the forward kill circuitry may perform the forward kill operation to prevent further processing of each of the threads in a target thread group when the forward kill operation is enabled for each of those threads and the group of graphics fragments corresponding to the target thread group are all determined to be obscured by later received graphics fragments. Hence, it may not be possible to perform a forward kill operation on only one thread of a thread group, and so enabling and disabling of the forward kill operation may also be performed at the granularity of a thread group, so that the forward kill operation can be disabled if any of the threads in the thread group reaches a portion of the thread including a forward kill blocking instruction. Hence, it is not essential to control the enabling and disabling of forward kill operations separately for each thread.

While the graphics processing apparatus supports the ability to change whether the forward kill operation is enabled or disabled at a midpoint of processing of a given thread, it is not essential to provide this functionality for all threads. For some threads it may be preferable to prohibit the forward kill operation throughout the thread regardless of whether processing has yet reached a portion comprising a forward kill blocking instruction. The graphics processing apparatus may still support such banning of forward kill operations for an entire thread. Hence, some threads may specify a forward kill prohibiting parameter which indicates that the forward kill operation is prohibited throughout the thread. In response to a thread specifying the forward kill prohibiting parameter, the thread processing circuitry may disable the forward kill operation at the start of processing of that thread and the forward kill operation may remain disabled until the end of the thread. In contrast, for other threads which do not specify the forward kill prohibiting parameter, the thread processing circuitry may enable the forward kill operation at the start of the thread, and then disable the forward kill operation upon reaching a portion of the given thread which includes at least one forward kill blocking instruction, which may be detected based on any of the mechanisms discussed above. Hence, the selected enabling and disabling of forward kill operations for specific portions within a thread may be overlaid on top of functionality which controls whether the forward kill operation is allowed or prohibited for the thread as a whole.

The threads of processing which are suppressed using a forward kill operation could correspond to a variety of functions performed on graphics fragments, such as depth testing, blending operations etc. However, it is particularly useful in cases where the thread processing circuitry comprises shader circuitry to perform threads of fragment shading processing on the graphics fragments. Fragment shading, which comprises processing for determining the pixel colour to be used for a given pixel, can be particularly computationally intensive, and so there can be a significant performance benefit in increasing opportunity for forward killing of shader threads by enabling forward kill operations to be performed for threads which include a forward kill blocking instruction.

FIG. 1 illustrates an example of a graphics processing pipeline 2 for processing graphics primitives for display of a frame of image data. Geometry data 4 defining a number of graphics primitives to be drawn in the rendered image is input to the pipeline. The primitives may correspond to triangles or other polygons to be drawn, for example. The geometry input may specify coordinates of the vertices of each primitive, and could also specify other properties of the primitive, such as a colour, transparency or depth associated with a given vertex.

Figure 2:
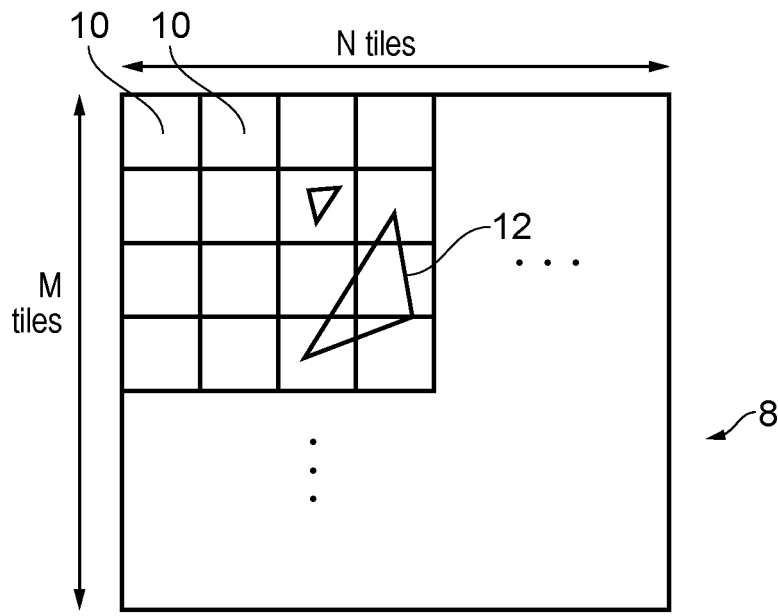
FIG. 2 shows an example of tiled rendering of graphics primitives.

A tiler stage 6 receives the geometry input and allocates each primitive to one or more tiles within the frame to be rendered. As shown in FIG. 2, the frame 8 may be divided into a grid of smaller tiles 10 of a certain size (e.g. 16×16 pixels or 32×32 pixels). Some primitives 11 may span more than one tile, and so may be allocated to more than one tile by the tiler 6. It is not essential for the tiles to be square, and in some examples rectangular tiles could be used. The remaining stages of the pipeline 2 use tile-based rendering, in which the operations for drawing the pixels in a given tile are completed before moving to the next tile of the image. Hence, the tiler 6 iterates through each successive tile of the frame 8, for each tile sending information on the set of primitives to be drawn in that tile to the primitive setup stage 12, and moving to the next tile once all the primitives of the previous tile have been sent, and continues iterating until all of the tiles in the frame are complete, at which point the geometry input 4 for a subsequent frame can be received and processed.

The primitive setup stage 12 performs various primitive setup operations on the group of primitives assigned to a given tile. For example, the primitive setup operations may identify additional properties of the primitive which are not explicitly indicated by the geometry data. For example, the primitive setup stage 12 may derive one or more edge functions which represent the positions of edges linking the respective vertices of the primitives, a depth function which represents the variation in depth across the primitive, or an interpolation function that represents the variation of attributes such as colour, shading, or transparency/opacity values across the primitive.

Figure 3:
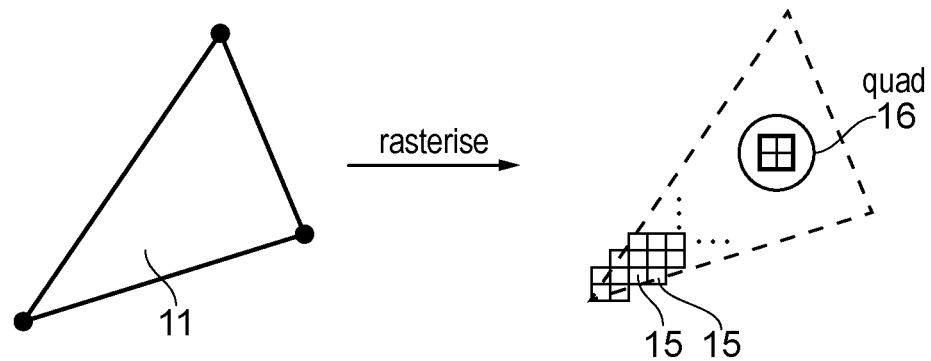
FIG. 3 shows an example of rasterising to generate graphics fragments corresponding to the graphics primitives.

As shown in FIG. 3, the primitives 11 are passed to a rasterizer stage 14 which converts the vertices and any additional primitive setup intimation for a given primitive into graphics fragments 15 representing properties (x-y position, depth, colour, transparency/opacity, etc.) of corresponding pixels of the area occupied by the primitive. In the embodiment discussed below, the fragments generated by the rasterizer 14 are processed by some downstream stages (e.g. the shader stage 26) in units of 2×2 blocks of pixels called quads 16 (with processing performed for each fragment in the same quad in parallel). However, this is not essential and other implementations could process each fragment individually, or in groups of a different number of fragments.

Figure 4:
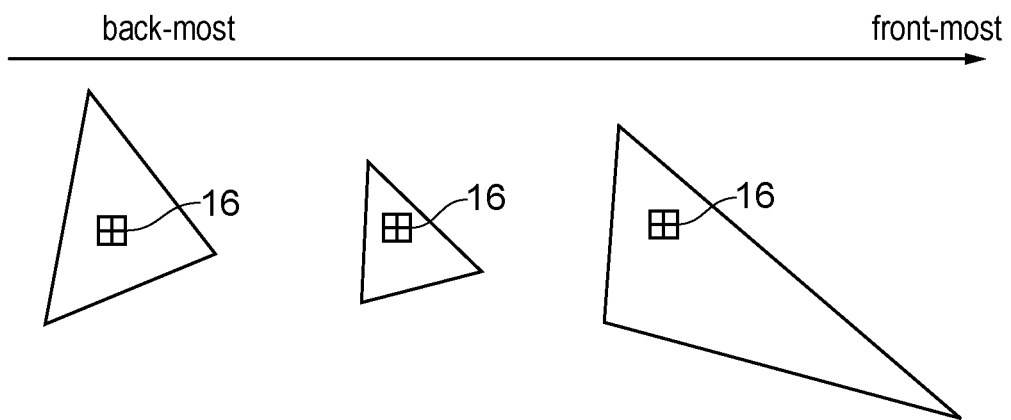
FIG. 4 illustrates an example where one graphics fragment may not contribute to the final displayed frame because it is obscured by another graphics fragment.

As shown in FIG. 4, different primitives associated with different depth values may include opaque fragments 15 or quads 16 at the same x-y position, so that only the front-most fragment or quad is visible in the final image. The fragments generated by the rasterizer 14 are subject to an early depth testing stage 18 which tests whether the depth associated with a later received fragment is such that the later fragment would be obscured by an earlier fragment which has already been drawn to tile buffers 20 for storing the latest values of pixels of the scene for which rendering is in progress. The tile buffers 20 may comprise one buffer per tile, and each tile may comprise a number of entries each corresponding to one pixel of that tile. The pipeline may maintain a Z stencil buffer 22 which stores, on a per pixel basis, a depth value Z which indicates the depth of the front-most fragment rendered at a given pixel position so far in the current tile. Hence, the early depth testing stage 18 may compare the depth associated with a latest received fragment with the depth indicated for a corresponding pixel coordinate in the Z stencil buffer 22, and suppress processing of the received fragment when it is determined that the depth position of the later received fragment is behind the depth position of the already drawn fragment whose depth is represented in the Z stencil buffer 22.

The early depth testing stage 18 helps eliminate processing of fragments in cases where the front-most fragment at a given pixel position is received before the back-most fragment, and so the later received fragment can have its processing suppressed because it will be hidden by an already drawn fragment. However, it is also possible that the back-most fragment may be received before the front-most fragment. Hence, fragments which pass the early depth testing stage 18 are provided to a forward pixel kill (FPK) stage 24 which identifies cases when an earlier received fragment would be obscured by a later received fragment. On receipt of a given fragment (a later received fragment), the FPK stage 24 tests whether an earlier received fragment still pending in the FPK stage 24 or a later stage of the pipeline 2 would be obscured by the given later received fragment. If so, the FPK stage 24 generates a kill request to request that further processing of the earlier received fragment is suppressed, to avoid expending further processing resource on processing of a fragment which would not contribute to the final image. The FPK stage is described in more detail below with respect to FIG. 5.

Fragments which are not killed by the FPK stage 24 are passed to a fragment shader stage 26 which comprises thread processing circuitry for performing threads of fragment shader processing for each fragment. For example the fragment shader may access texture data defining functions representing a pattern or texture to be rendered within a given primitive and may use this to determine the precise colour to assign to a given pixel (colours initially assigned by the primitive setup and rasteriser stages 12, 14 may be initial values for the shader threads). The fragment shader stage may execute a number of threads of processing corresponding to the respective fragments of the same quad 16 in parallel. In some implementations, the fragment shader core may also have resources for processing multiple quads 16 in parallel. Fragment shader execution is relatively processor-intensive, which is why it can be useful for the FPK stage 24 to be able to suppress a target thread of fragment shader execution if it is found that a later received fragment will obscure the earlier fragment corresponding to the target thread. The fragment shader core 26 is described in more detail with respect to FIGS. 6 to 8 below.

The shaded fragments are provided to a late depth testing stage 28 which tests whether the depth associated with the shaded fragment is such that the fragment will be obscured by an already rendered fragment as indicated by the depth in the Z stencil buffer 22. The late depth testing stage 28 is provided because there are some fragments for which the depth value may not be available in time for the early depth testing stage 18, or for which the depth may change during the fragment shader execution. Late depth testing also enables detection of overdrawn fragments in cases where, at the time the later fragment is at the early depth testing stage 18, the earlier fragment which would obscure that later fragment is still pending in the pipeline and has not yet updated the Z stencil buffer 22 (but will do so by the time the later fragment reaches the late depth testing stage 28). Also, the late depth testing stage 28 enables handling of transparent objects whose transparency may only become apparent during the fragment shader execution. If any fragments are found by the late depth testing stage 28 to be obscured by already drawn fragments, they are suppressed and prevented from being drawn to the corresponding tile. Remaining fragments are passed to a blending stage 30 which performs blending to blend properties of transparent fragments with the next front-most fragments at corresponding pixel positions, and writes the resulting pixel values to corresponding entries of a currently active tile buffer. For opaque objects, the blending stage 30 may simply overwrite previous pixel values in the tile buffer. When processing of all fragments for a tile is complete, processing moves to the next tile represented by a different tile buffer.

While FIG. 1 shows an example using tile-based rendering, which can be advantageous in order to reduce cache capacity and memory bandwidth required, other examples may use immediate mode rendering, in which the primitives for the entire frame are passed down the pipeline in any order, without first grouping them together into tiles. The techniques for forward pixel killing described below can be used for both tile-based and immediate mode rendering graphics pipelines. However, they are particularly useful for tile-based renders because the localised nature of the processing of primitives associated with one tile before moving to the next tile makes it more likely that, when a later fragment is received by the forward pixel kill stage 24, the earlier fragment which would be obscured by that later received fragment is still pending in the pipeline so that a forward kill operation is possible.

Figure 5:
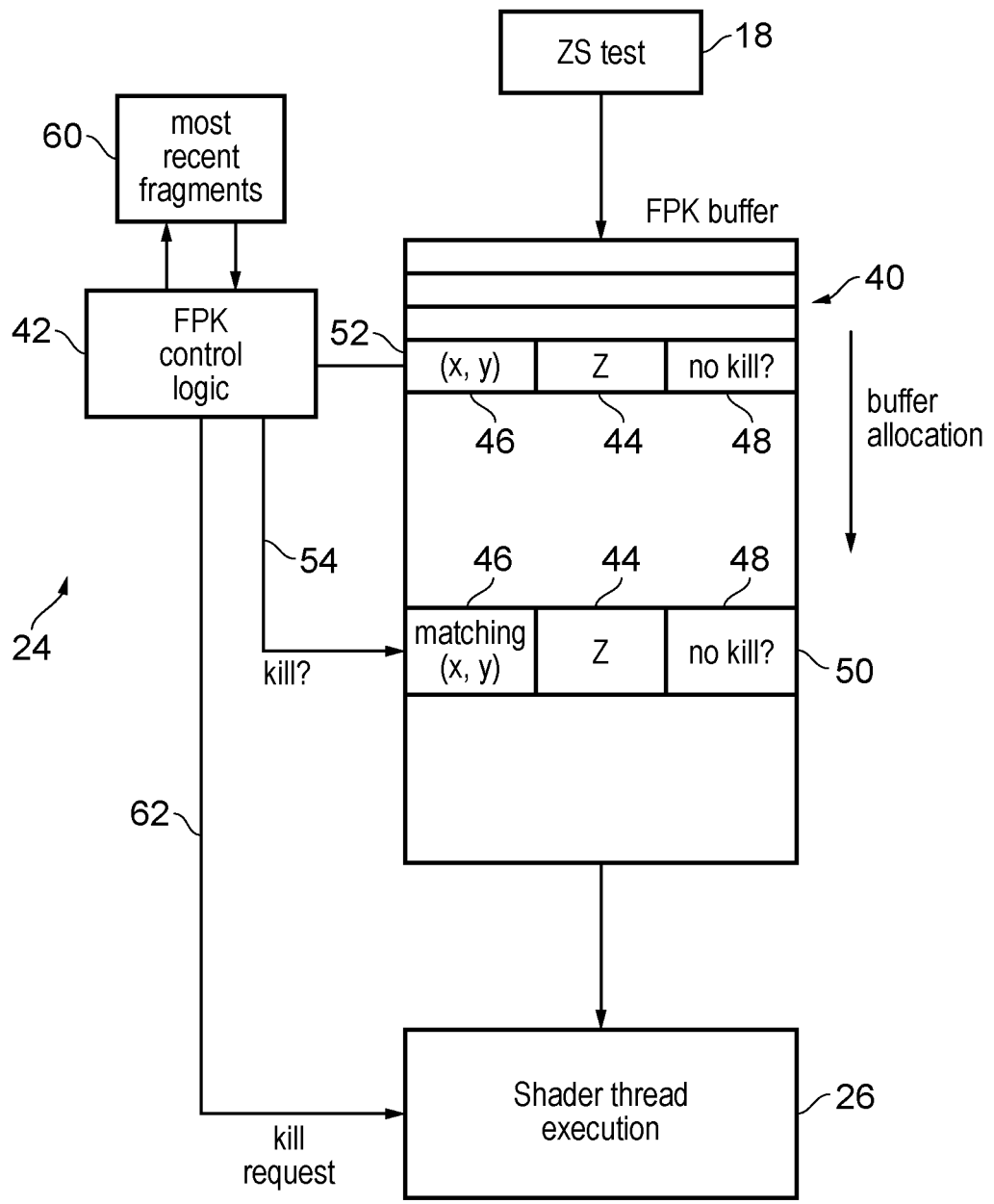
FIG. 5 shows an example of a forward kill stage for triggering forward killing of processing relating to an earlier graphics fragment when the earlier graphics fragment is determined to be obscured by one of more later graphics fragments.

FIG. 5 illustrates an example of the forward pixel kill (FPK) stage 24 in more detail. The FPK stage 24 includes an FPK buffer 40 for buffering information on the received fragments for a number of cycles before providing them to the shader stage 26. Each fragment in the buffer may be associated with coordinates 46 defining the x-y position of the fragment, a depth value 44 defining the z position, and optionally a no-kill parameter 48 indicating whether processing of that fragment is allowed to be suppressed by the FPK stage 24 on detection of a later fragment which would obscure that fragment.

FPK control logic 42 compares the depth values 44 and coordinates 46 of the respective fragments pending in the FPK buffer 40 to identify instances where an earlier fragment 50 would be obscured by one or more later fragments 52 pending in the FPK buffer 40 and the depth values 44 for the respective fragments 50, 52 are such that the later fragment 52 will obscure the earlier fragment 50 in the rendered image. In some cases, an earlier fragment 50 may not be fully obscured by any one later fragment, but may be partially obscured by one later fragment and a remaining part of the earlier fragment 50 may be obscured by another later fragment, so that the combination of two or more later received fragments may completely obscure the earlier fragment 50. Hence, the FPK control logic 42 may in some embodiments also check for cases when multiple fragments in combination obscure another fragment. Alternatively, in other embodiments the logic for identifying cases where multiple fragments together obscure an earlier fragment may be omitted to save circuit area, in which case only cases where an earlier fragment is fully obscured by a single later fragment may be identified. When an earlier received fragment 50 is determined to be obscured by one or more later received fragments 52 and the earlier fragment's no kill parameter 48 does not specify that forward kill operations should be blocked for that fragment), then the FPK control logic 42 issues a kill signal 54 to the FPK buffer 40 to trigger the entry corresponding to the earlier fragment 50 to be invalidated, to prevent that fragment being passed to downstream stages of the pipeline 2 for further processing.

The size of the FPK buffer 40 and the policy for draining items from the buffer and forwarding them onto the shader thread stage 26 may be designed to increase the likelihood that fragments remain pending in the FPK buffer for a number of cycles before progressing to the shader core 26. For example, even if the fragment shader stage 26 could accept a further fragment from the FPK buffer 40, forwarding of fragments to the shader stage 26 may be paused when a current FPK buffer occupancy is less than a certain minimum threshold occupancy. While it may seem counterintuitive to delay processing of a given fragment which could be forwarded for shader execution, in practice this can increase the overall performance of the pipeline by increasing the window within which it is possible to kill a thread before the thread is issued to the fragment shader stage 26.

However, sometimes the earlier fragment may have already left the FPK buffer 40 and the shader thread execution may have already started before a later fragment arrives at the FPK buffer 40 for the same x, y position. To allow further performance savings beyond the window provided by the FPK buffer 40, the FPK control logic 42 may also maintain a recent fragment buffer 60 indicating properties of a given number of recently encountered fragments. For example, the recent fragment buffer 60 may have the same format as the FPK buffer 40 and each time an entry is removed from the FPK buffer 40 for forwarding the fragment to the shader execution stage 26, the entry may be allocated to the recent fragment buffer 60. The recent fragment buffer 60 may operate as a FIFO (first in first out) buffer, so that when the recent fragment buffer 60 becomes full, subsequent allocations overwrite the oldest pending entry. The FPK control logic 42 may compare the later received fragments 52 in the FPK buffer 40 with recently issued fragments represented in the recent fragment buffer 60, for which shader execution has already begun, and check for similar obscuration conditions to those checked for the entries in the FPK buffer 40 itself. When an obscuration condition is detected (when an earlier graphics fragment would be obscured in the display by one or more later graphics fragments), the FPK control logic 42 sends a kill request 62 to the shader execution stage 26 to request that any further processing of a thread of processing corresponding to the given fragment is suppressed. As will be described below, the shader execution stage 26 need not necessarily act upon the kill request, depending on whether forward kill operations are enabled for a given thread as discussed below.

In some embodiments, each individual fragment may have a respective entry in the FPK and recent fragment buffers 40, 60. However, as discussed below, some implementations may use SIMT (single instruction multiple thread) processing in the shader core 26, which can make it more efficient to control forward killing for a group of threads (e.g. for a quad comprising 4 threads for a 2×2 block of fragments). Hence, in some cases the FPK buffer 40 may allocate only one entry per quad (or group of fragments), and detect cases where an entire quad is obscured by another quad, with no FPK operation being triggered if only some fragments of the quad (group) would be obscured by other fragments.

Figure 6:
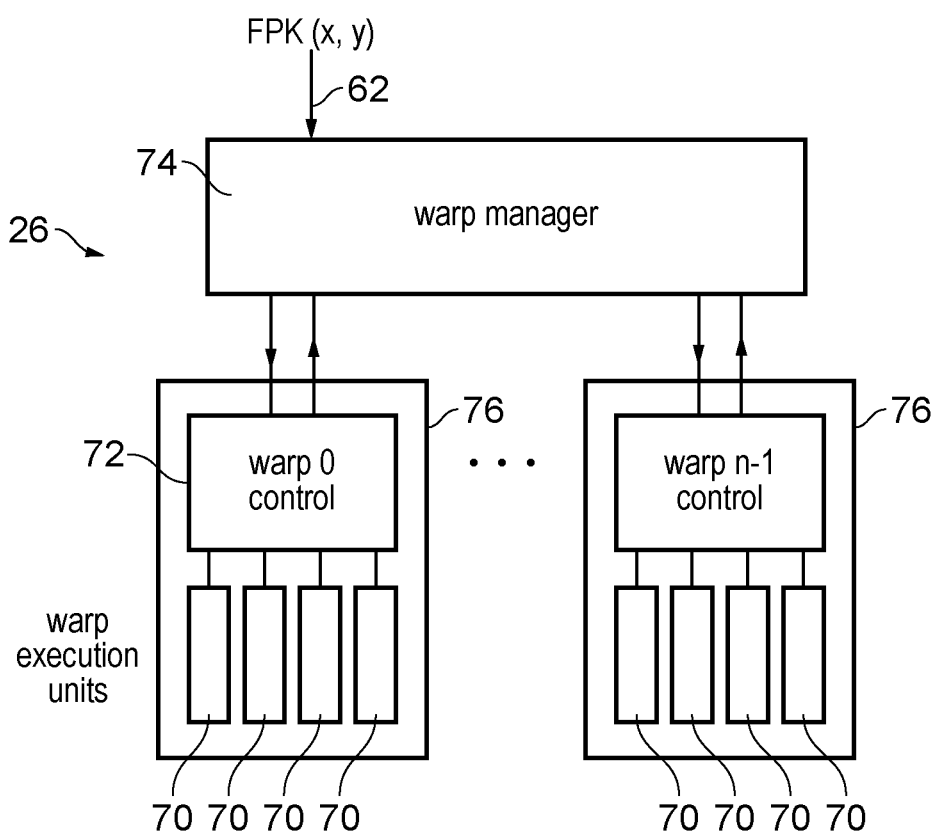
FIG. 6 shows an example of a fragment shader core for executing threads of processing corresponding to the graphics fragments.

FIG. 6 shows an example of a portion of the shader core 26, which comprises a number of execution units 70 each for processing a respective thread of fragment shading processing on a given fragment. The threads are processed in groups, and the hardware for processing a given thread group is called a "warp" 76. In this example, each warp 76 processes four threads, processed using a corresponding set of four execution units 70. The group of execution units 70 in the same warp are controlled by a warp control unit 72 and a certain number (n) of warps are implemented in parallel, with each warp comprising a corresponding warp control unit 72. The number of warps 76, n, may vary from implementation to implementation. In some examples, the shader core 26 may only comprise a single warp (n=1), while other examples may have more than one warp implemented in parallel (n=2 or more). A warp manager 74 allocates processing of the threads corresponding to fragments in the same quad to a given warp 76. The warp manager 74 and warp controllers 72 of the respective warps 76 may exchange signals for controlling the scheduling of threads on a given warp.

Figure 7:
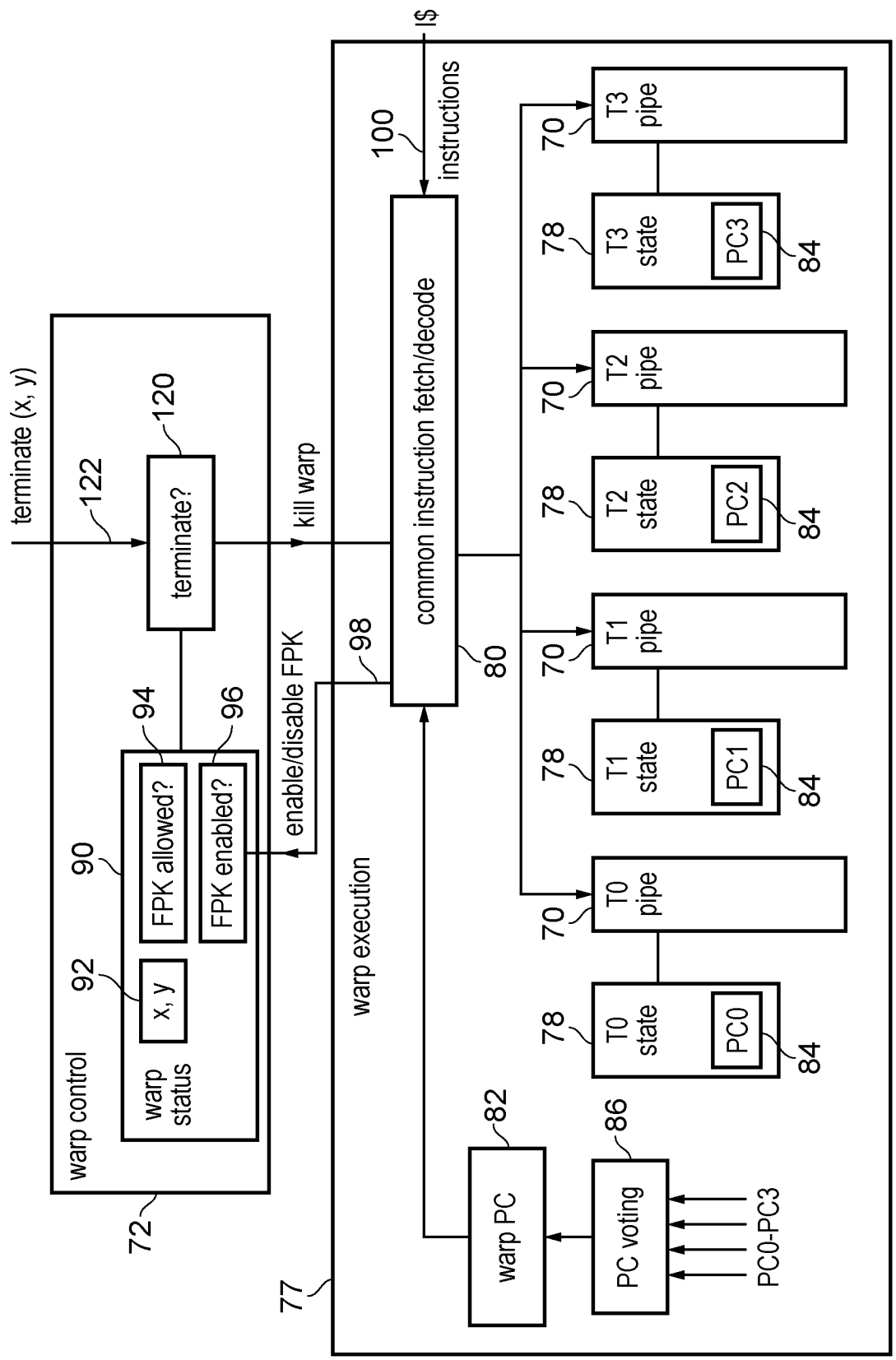
FIG. 7 shows an example of a portion of the shader core in more detail.

FIG. 7 shows an example of one warp 76, including the warp control unit 72 and the group 77 of execution units 70. Each warp execution unit 70 has access to a corresponding set of thread state 78 stored in registers, which defines the architectural data associated with a thread processed by the corresponding thread execution unit 70. Each execution unit 70 executes instructions from a common shader program, but using different data inputs as defined by the thread state 78. Common instruction fetch/decode logic 80 is shared between the respective execution units 70 of the same warp, so that in each cycle the same instruction is issued for execution in parallel on at least a subset of the thread execution units 70 (it is not possible for the execution units 70 within the same warp 76 to execute different instructions in the same cycle). A warp program counter (or thread group program counter) 82 represents the instruction address of the current point of execution in the common program reached by the warp as a whole, and controls the fetching logic 80 to fetch the instruction indicated by the warp program counter 82.

During the course of execution of the common program, threads within the same warp may diverge in the paths taken through the common program depending on the data inputs of the respective threads (different data inputs may lead conditional branches to have different outcomes for different threads). Hence, each thread state includes a corresponding thread program counter 84 which represents the next instruction to be executed by the corresponding execution unit 70 for the corresponding thread. Each thread program counter 84 is incremented (or updated non-consecutively in the event of a branch) based on the outcome of processing of the corresponding thread. Program counter voting logic 86 is provided to select, based on the individual thread program counters 84 for each thread of the warp, which value to set to the global warp program counter 82 which controls which instruction is fetched in the next cycle.

This type of processing may be referred to as single instruction multiple thread (SIMT) processing. As the respective pixels in one quad are likely to have similar input values they are likely to take similar paths through the thread shader program, and so it can be efficient to control execution of the corresponding threads using SIMT to reduce the instruction fetch/decode overhead.

FIG. 8 shows an example of execution of a simple sequence of instructions using SIMT processing for a warp comprising 4 threads, but it will be appreciated that other numbers of threads could also be processed in a SIMT manner. A common sequence of instructions is executed in lockstep by each thread of the warp (thread group). The warp program counter 82 indicates the address of the current instruction being processed by the group as a whole. The group program counter 82 is derived from the thread program counters 84 (tPC0-tPC3) of the individual threads in the group (for example by program counter voting). For example, the group program counter 82 may correspond to the lowest address indicated by any of the thread program counters 84 for the group of threads. For each thread within the group, the instruction indicated by the group program counter 82 is executed in the current processing cycle if the thread program counter 84 for that thread matches the group program counter 82. If the thread program counter 84 for a given thread does not match the group program counter 82, the corresponding warp execution unit 70 is idle for a cycle (although it will be appreciated that execution of instructions by each warp execution unit 70 may be pipelined so when part of an execution unit 70 is idle other stages may still be carrying out operations relating to an instruction issued in an earlier or later cycle).

Hence, in the example of FIG. 8:

In cycle 0, the group program counter 82 indicates address # add, and all the thread program counters 84 for threads 0 to 3 also indicate address # add. Therefore, all the threads execute the ADD instruction at address # add. Different threads may execute the ADD instruction using different operands so that a number of different additions are performed in parallel for the respective threads.

In cycle 1, a compare instruction CMP at address # add+4 is executed to compare the result r2 of the ADD instruction with an immediate value 19. For threads 0, 1 and 3, the result r2 was not equal to 19, while for thread 2 the result r2 was equal to 19.

In cycle 2, a branch instruction BNE branches to address # add+16 if the outcome of the CMP instruction in cycle 1 was not equal (NE). For threads 0, 1 and 3, the branch is taken and so the thread program counters 84 for these threads are set to # add+16. However, for thread 2 the outcome of the CMP instruction was equal (EQ), and so the branch is not taken and the thread program counter 84 for thread 2 is incremented to # add+12. Hence, now there are threads with different values of the thread program counter 84, and there is different behaviour between the threads.

In cycle 3, the group program counter 82 is set to # add+12 to match the lowest of the thread program counters 84 (in this case, the thread program counter 84 for thread 2). For thread 2, the multiply instruction MUL at address # add+12 is executed. However, no instruction is executed in cycle 3 for threads 0, 1 and 3 because the thread program counters 84 for these threads do not match the group thread program counter 82. These threads wait until the group program counter 84 reaches # add+16 before resuming instruction execution.

In cycle 4, the group program counter 82 is incremented to # add+16, and so now the threads 0 to 3 re-converge and execute the store instruction STR at address # add+16 to store a value to a memory address determined based on a base address and index, with different threads using different indices for determining the target address. The memory accesses for at least some of the threads can be coalesced into a single memory access if the indices are such that the accesses target the same region of memory (e.g. the same cache line, or the same page of the address space).

Hence, in the example of FIG. 8, as the threads require the same instructions to be executed on different data values, they can be processed efficiently as a group, because this allows a single instruction fetch to be amortized across the group of threads and memory accesses to be coalesced. However, branch instructions, for example, may cause different behaviour, such as when thread 2 required a different instruction to the other threads. While in FIG. 8 this led to only a single cycle bubble in the pipelines for threads 0, 1 and 3, in other cases the divergence could last longer. There may be events other than branches which cause similar differences in behaviour. When threads in a warp diverge, there may be a significant number of cycles in which threads cannot execute their next operation because they must wait while other threads execute different operations, and this reduces efficiency. Hence, the efficiency of the processing may depend on how the threads are grouped together. In practice, by allocating the threads for fragments in the same quad (2×2 pixel block) to the same warp, the likelihood of the threads in the warp diverging can be reduced.

When threads are processed in SIMT manner as discussed above, then it may not be efficient to allow the forward pixel kill operation to kill just one thread of the warp, since even if that thread is terminated, the other threads in the same warp would still need to proceed, and as each of the execution units 70 in the same warp are controlled by a common fetch/decode block 80, it would not be possible to schedule a thread relating to a new fragment in place of the previously processed fragment until the other threads in the warp have completed. Hence, forward kill operations may be controlled for the warp as a whole.

Returning to FIG. 7, the warp controller 72 for a given warp 76 may maintain warp status information 90 which defines various properties of the group of threads being processed by the corresponding warp 76. For example the warp status information may include coordinate information 92 specifying the x-y position of the fragments/quad being processed. The warp status information 90 may also include one or more flags 94, 96 indicating whether it is possible to perform forward pixel kill operations to terminate the threads of the corresponding warp. In the example of FIG. 7 these flags include a forward kill allowed flag 94 which specifies globally for the entire thread whether a forward pixel kill operation would be allowed to terminate that thread at any point, as well as a forward kill enable flag 96 which indicates whether, if the forward kill allowed flag 94 allows forward kill operations, the forward kill operations are currently enabled at the current point of execution reached by that particular group of threads. The forward kill allowed flag 94 may be set once at the start of a thread depending on thread descriptor information associated with a particular thread group. The thread descriptor information may be part of the program code of the common shader program being executed for each of the threads. On the other hand the forward kill enable flag 96 may be set or cleared at different points within a thread depending on an FPK enable/disable signal 98 sent by the common instruction fetch and decode logic 80 of the warp execution unit 76, which is determined based on the stream of instructions 100 sent from the instruction cache when fetching instructions from the common shader program.

Figure 9:
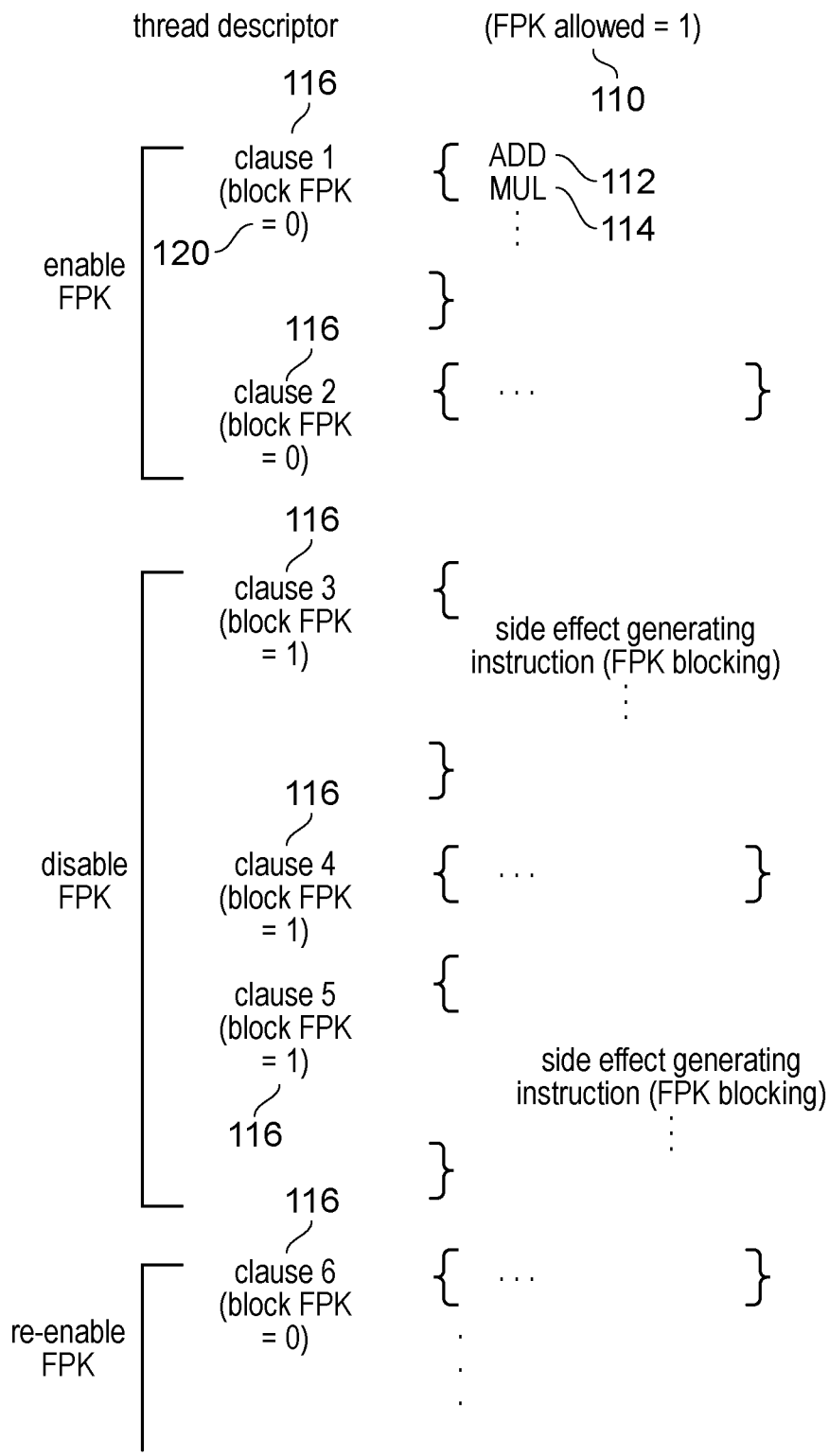
FIG. 9 shows an example of annotating clauses within program code with a forward kill enable parameter specifying whether the forward kill operation is enabled or disabled for a given portion of the program code.

FIG. 9 schematically illustrates an example of a portion of program code for a given shader program. A thread descriptor 104 provided in a header portion of the program code specifies a FPK allowed parameter 110 which specifies for the thread as a whole whether forward kill operations are allowed. In this example the allowed parameter is set to 1 to indicate that forward kill operations are allowed to terminate the thread. By setting the FPK allowed parameter 110 to 0 (representing a forward kill prohibiting parameter), FPK operations can be disabled for the entire thread.

The program code includes a number of clauses 1 to 6, each clause representing a portion of the program and including a sequence of instructions 112, 114 etc. The partitioning of the program into clauses may be controlled by a compiler, e.g. distinct functions or subroutines within the program may be assigned to each clause. Each clause may be preceded by a clause header 116 which may specify control information to be used to control the processing of the corresponding block of instructions. The header may be stored in the instruction cache along with the corresponding instructions of the clauses themselves, and may be interpreted by the instruction fetching/decoding logic 80. As shown in FIG. 9, each clause may specify within its clause header 116 a forward kill enable parameter (blockFPK parameter) 120 which specifies whether forward kill operations should be enabled or disabled during the corresponding clause within the program being executed. In this example, when blockFPK=0 then forward kill operations are enabled during the corresponding clause and when blockFPK=1 then forward kill operations are disabled, but it will be appreciated that the opposite mapping could also be used. Hence, each time the instruction fetch/decode logic 80 reaches a new clause, it obtains the clause header from the instruction cache and extracts the blockFPK parameter 120. The blockFPK parameter 120 is used to generate the enable/disable signal 98 sent to the warp controller 72, e.g. the value of the blockFPK parameter 120 read from the header may be copied direct to the enable flag 96 within the warp status information 90, or inverted before writing to the FPK enable flag 96 if an opposite mapping is used in the blockFPK parameter 120 compared to the FPK enabled flag 96 (this is the case in the example shown in FIGS. 7 and 9).

When the FPK stage 24 generates an FPK request 62, the warp manager 74 issues a terminate request to each warp 76 specifying x-y coordinates of the quad for which the corresponding threads are to be killed. In case it is possible that multiple quads may be processed corresponding to the same x-y position but different depths, further information (such as the depth value or a quad/fragment ID) could also be supplied. Each warp's warp controller 72 comprises terminate control logic 120 which compares the parameters of the terminate request with the warp status information (e.g. the x-y coordinates 92 and any other information) relating to the currently processed group of threads, to determine whether the current group of threads matches the parameters specified by the terminate request. If the current group of threads matches the parameters specified by the terminate request, and both the FPK allowed parameter 94 and the FPK enabled parameter 96 are set to enable the FPK operation to terminate the corresponding threads, then a kill signal 122 is sent to the warp execution units 77, to trigger suspension of the current threads of processing by that warp 76 and enable reallocation of the warp to handling threads corresponding to a different quad (group of fragments).

This enables FPK operations to be suppressed for threads which include one or more FPK blocking instructions which generate a side effect which may potentially need to proceed regardless of whether the corresponding fragment is visible in the final rendered scene. As shown in FIG. 9, for this particular example the instructions which generate side effects are in clauses 3 to 5, so that the first side effect generating instruction (forward kill blocking instruction) is encountered in clause 3 and the last side effect generating instruction is encountered in clause 5. Therefore, the clause headers for clauses 3, 4 and 5 are all set with blockFPK=1, so that when processing of clause 3 starts then this will trigger the FPK enable flag 96 to be set to a value which disables forward kill operations. Subsequently, the forward kill operations are not re-enabled until processing has reached clause 6 which has a blockFPK flag of 0. Even if clause 4 does not itself contain any side effect generating instructions, it still has its blockFPK flag set to one because having performed clause 3 which did generate a side effect, it may be preferable not to kill the operation of the thread until after the last side effect has been generated, to ensure that all the side effects are performed atomically. The values of the blockFPK flags in each clause header 116 and the FPK allowed flag in the thread descriptor 104 may be set by the compiler when compiling the executed program.

FIG. 10 shows an alternative way of marking the portions of code which contain side effect generating instructions. In this case a forward kill blocking start instruction 130 may be included by the compiler in the program code of the shader program at the point when forward kill operations should be disabled, and a forward kill block end instruction 132 can be included later in the program code after the final side effect generating instruction, to trigger re-enabling of forward kill operations.

Alternatively, in other examples the decode circuitry 80 may be able to detect that certain instructions are side-effect generating instructions from their instruction encoding without any explicit annotation or additional instructions included by the compiler.

Hence, rather than simply disabling forward kill operations throughout the entire thread if the thread contains any side effect generating instruction, this technique enables more fine-grained control over whether forward kill operations can terminate a thread, so that it is possible to terminate the thread if processing has not yet progressed to the first side effect generating instruction or has progressed beyond the last side effect generating instruction. This enables improved performance by reducing the amount of unneeded processing that is carried out by the fragment shader 26.

While the example of FIGS. 6 to 8 shows processing of threads of shader execution in threads groups or "warps" in a SIMT manner, under control of a common program counter 82 shared between the group of threads, this is not essential on other graphics pipelines could process each thread independently with a separate fetch and decode stage for each thread processing pipeline. Hence, it is also possible to control whether forward kill operations are allowed/prohibited or enabled/disabled at the granularity of groups of threads. In such cases, the FPK allowed/enabled flags 94, 96 may be provided per thread instead of per thread group, and also the FPK stage 24 may track each fragment individually instead of in quads/groups.

Providing the FPK allowed parameter 94 is not essential. Some implementations may not provide capability to disable FPK operations globally for the thread as a whole, but may provide only the local enable/disable flag 96 which can be set/cleared at specific portions of code.

Figure 11:
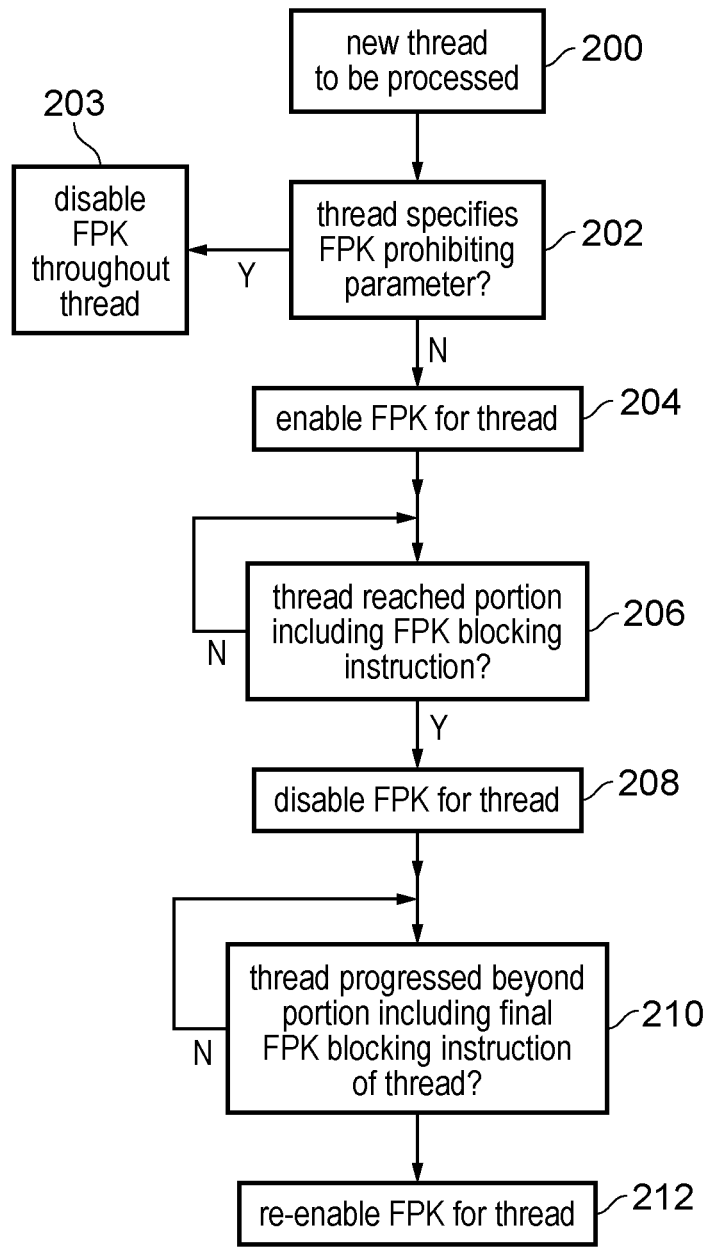
FIG. 11 is a flow diagram illustrating a method of enabling and disabling a forward kill operation.

FIG. 11 is a flow diagram showing a method of determining whether to enable or disable forward kill operations for a given thread. For example this may be performed by the shader execution stage (thread processing unit) 26, e.g. in the warp execution unit 76 and the warp controller 72 shown in FIG. 7. At step 200, a new thread of processing for a given graphics fragment is allocated for processing by the thread processing unit 26. At step 202 it is determined whether the thread specifies a forward kill prohibiting parameter which would prohibit any forward kill operations for the entire thread. If so then at step 203 the forward kill allowed flag 94 is updated to disable forward kill operation throughout the thread regardless of which portion of the thread has been reached. If the thread does not specify any forward kill prohibiting parameter (e.g. the forward kill allowed flag 110 is set to 1 in the example of FIG. 9) then at step 204 forward kill operations are initially enabled for the thread. At step 204 the forward kill allowed flag 94 is updated to indicate that forward kill operations are in principle allowed (depending on the value of the forward kill enable flag 96), and the forward kill enable flag 96 is set to indicate that forward kill operations are currently enabled. Regardless of whether step 203 or 204 is performed, processing of the thread is started.

If FPK was not prohibited, then following step 204, the thread processing unit 26 determines at step 206 whether the thread has reached a portion which includes a forward kill blocking instruction. For example this may be determined based on the clause header marking the start of the portion of codes to be processed, which may include a forward kill enable/disable flag (blockFPK flag) 120 as shown in FIG. 9. Alternatively the portion could identified by the inclusion of a forward kill block start instruction 130 as shown in FIG. 10. Also, the forward kill block instruction could be identified directly from its encoding. When a portion of the thread including a forward kill blocking instruction is reached, then at step 208 the thread processing unit 26 disables forward kill operations for that thread (e.g. by updating the FPK enabled flag 96 to indicate that the FPK operations are disabled). Hence any forward kill requests from the forward kill stage 24 matching that particular thread, if received, would be rejected.

At step 210 it is determined whether the thread has progressed beyond the portion which includes the final forward kill blocking instruction of the thread. This could be detected based on the forward kill enable/disable value 120 in the clause header preceding a given clause of the program code, or could be detected from the forward kill block end instruction 132 or from any other annotation information provided by the compiler which may indicate that there will be no further side effect generating instructions. When the thread is detected to have progressed beyond the final forward kill blocking instruction, then at step 212 the forward kill operation is re-enabled for the current thread, for example by setting the forward kill enable flag 96 to a value indicating that FPK operations are enabled.

If at any point the thread reaches the final instruction of the program, then the method of FIG. 11 is terminated. Hence it is not essential for a given thread to encounter one of the events shown in steps 206 or 210. Threads which do not contain any forward kill block instructions may never pass step 206 and so once the thread completes then the method ends without progressing to step 208.

Figure 12:
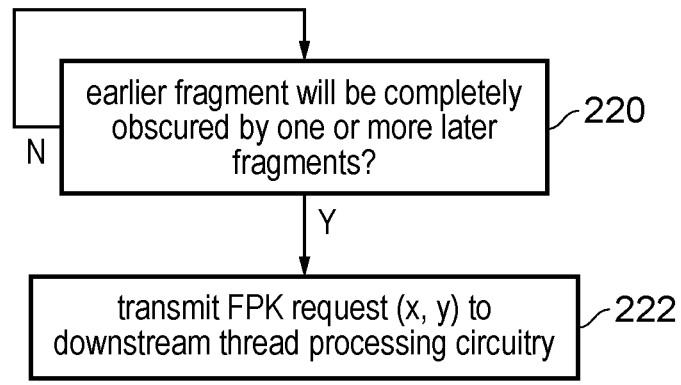
FIG. 12 is a flow diagram illustrating a method of generating a request to perform a forward kill operation.

FIG. 12 is a flow diagram showing a method of generating forward kill requests at the forward pixel kill stage 24. At step 220 the forward kill stage determines whether an earlier fragment would be completely obscured by one or more later fragments (individually or in combination) and if this condition is detected then at step 222 a forward kill request specifying the coordinates of the fragment to be killed is sent to the downstream thread program circuitry 26.

Figure 13:
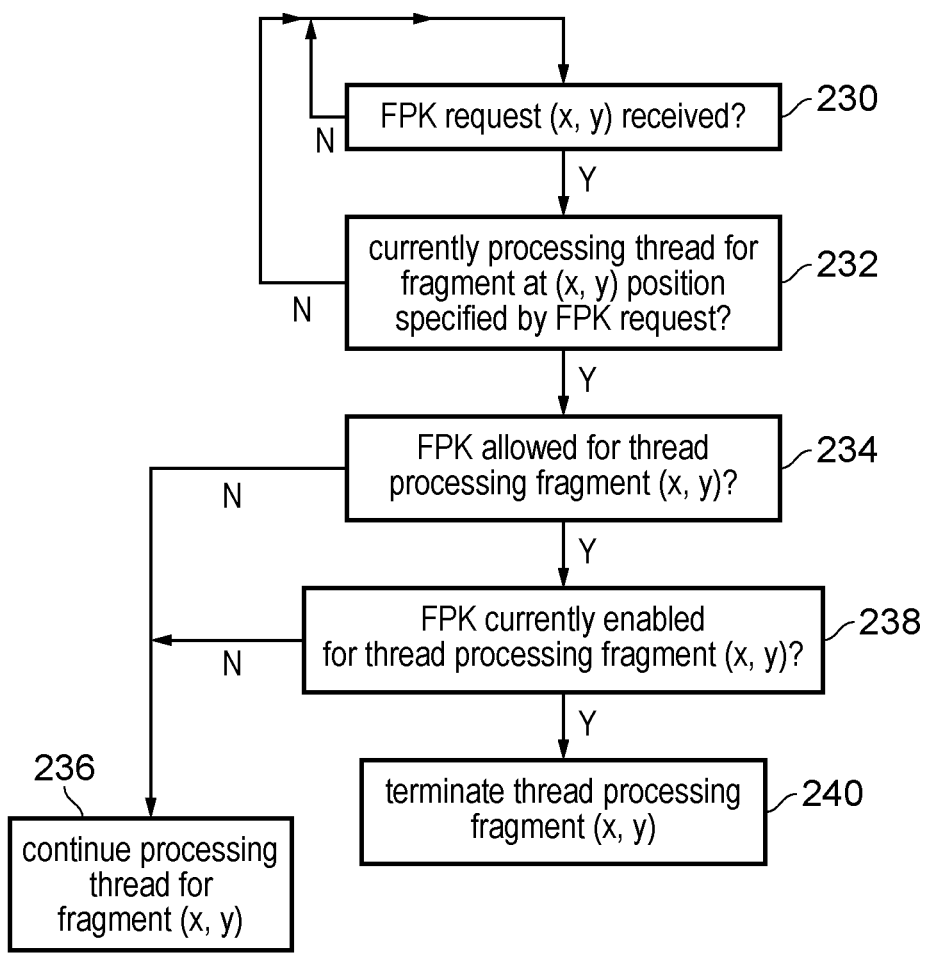
FIG. 13 is a flow diagram illustrating a method of determining whether to act upon a request to perform a forward kill operation.

FIG. 13 is a flow diagram illustrating a method of responding to forward kill requests at the thread processing circuitry 26. For example this may be performed by the warp controller 72 shown in FIG. 7. At step 230, a forward kill request is received specifying particular coordinates of the fragment to be killed. In some cases the forward kill request may also specify other information, such as a primitive ID or depth value in cases where it is necessary to distinguish between multiple fragments at the same x, y coordinates. At step 232 the thread processing circuitry 26 determines whether it is currently processing a thread for a fragment matching the information specified by the FPK request, and if not, then the request is ignored and the method returns to step 230 to wait for a further FPK request. If the thread processing circuitry 26 is currently processing a thread matching the information specified by the FPK request, then at step 234 the thread processing circuitry 26 determines whether forward kill operations are allowed for the particular thread which is processing the relevant fragment. If not then at step 236 processing of that thread continues without being killed. If forward kill operations are in principle allowed (as determined based on the forward kill allowed flag 94) then at step 238 it is determined from the FPK enable flag 96 whether forward kill operations are currently enabled for that particular thread, and if not then again processing continues at step 236 without killing the thread. Hence, forward kill operations can be disabled during portions of coding introducing side effects beyond the mere updating of the tile buffers 20. If forward kill operations are determined at step 238 to be currently enabled, then at step 240 the thread processing circuitry 26 terminates further processing of the thread which was processing the relevant fragment. Hence, this allows processing of an earlier fragment in the pipeline which has progressed deeper down the pipeline to be terminated when it will be overdrawn by a later fragment which is earlier in the pipeline at the forward pixel kill stage 24.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus for processing graphics primitives for display, comprising:
fragment generating circuitry to generate graphics fragments corresponding to the graphics primitives;
thread processing circuitry to perform threads of processing corresponding to the graphics fragments; and
forward kill circuitry to trigger a forward kill operation to prevent the thread processing circuitry performing further processing of a target thread of processing corresponding to an earlier graphics fragment when the forward kill operation is enabled for the target thread and the earlier graphics fragment is determined to be obscured in said display by one or more later graphics fragments;
wherein in response to a given target thread including at least one forward kill blocking instruction having a property indicative that the forward kill operation should be disabled for the given target thread;
when said thread processing circuitry has not yet reached a portion of the given target thread including said at least one forward kill blocking instruction, the thread processing circuitry is configured to enable the forward kill operation for the given target thread, where when the forward kill operation is enabled, if the forward kill circuitry detects that the given target thread corresponds to an earlier graphics fragment that would be obscured in said display by one or more later graphics fragments, the thread processing circuitry is configured to terminate processing of the given target thread; and
when said thread processing circuitry has reached the portion of the given target thread including said at least one forward kill blocking instruction, the thread processing circuitry is configured to disable the forward kill operation, where when the forward kill operation is disabled, if the forward kill circuitry detects that the given target thread corresponds to an earlier graphics fragment that would be obscured in said display by one or more later graphics fragments, then the thread processing circuitry is configured to continue processing of the given target thread even though the earlier graphics fragment would be obscured in the display by the one or more later graphics fragments.

2. The apparatus according to claim 1, wherein the thread processing circuitry is configured to trigger disabling of the forward kill operation for the given target thread in response to the thread processing circuitry reaching said portion of the given target thread including said at least one forward kill blocking instruction.

3. The apparatus according to claim 1, wherein the thread processing circuitry is configured to trigger re-enabling of the forward kill operation for the given target thread in response to the given target thread progressing beyond a portion of the given target thread including a final forward kill blocking instruction of the given target thread.

4. The apparatus according to claim 3, wherein the thread processing circuitry is configured to detect that the given target thread has progressed beyond said portion including said at least one forward kill blocking instruction, in response to a forward kill blocking end instruction of the given target thread.

5. The apparatus according to claim 1, wherein in response to the thread processing circuitry reaching a given portion of the given target thread, the thread processing circuitry is configured to detect a forward kill enable parameter specified for said given portion and to control whether the forward kill operation is enabled or disabled for the given target thread in dependence on the forward kill enable parameter.

6. The apparatus according to claim 5, wherein the forward kill enable parameter is specified in a portion header providing control information for controlling execution of instructions in said given portion of the given target thread.

7. The apparatus according to claim 5, wherein the thread processing circuitry is configured to maintain a thread forward kill enable status value indicative of whether the forward kill operation is enabled or disabled for the given target thread; and
in response to reaching said given portion of the given target thread, the thread processing circuitry is configured to set the thread forward kill enable status value for the given target thread to a value dependent on a value of said forward kill enable parameter for the given portion of the given target thread.

8. The apparatus according to claim 1, wherein the thread processing circuitry is configured to detect that the given target thread has reached said portion including said at least one forward kill blocking instruction, in response to a forward kill blocking start instruction of the given target thread.

9. The apparatus according to claim 1, wherein the thread processing circuitry is configured to process at least one thread group comprising a plurality of threads corresponding to a group of graphics fragments.

10. The apparatus according to claim 9, wherein for each thread group, the thread processing circuitry is configured to control, in dependence on a group program counter shared between the threads of the same thread group, fetching of a next instruction to be executed by at least a subset of the plurality of threads in the same thread group.

11. The apparatus according to claim 10, wherein the forward kill circuitry is configured to perform the forward kill operation to prevent further processing of each of the threads in a target thread group when the forward kill operation is enabled for each of the threads in the target thread group and the group of graphics fragments corresponding to the target thread group are all determined to be obscured by one or more later received graphics fragments.

12. The apparatus according to claim 9, wherein the thread processing circuitry is configured to trigger disabling of the forward kill operation for each of the threads of a target thread group when any of the threads of the target thread group reaches a portion of the thread including a forward kill blocking instruction.

13. The apparatus according to claim 1, wherein the thread processing circuitry is responsive to a thread specifying a forward kill prohibiting parameter indicative that the forward kill operation is prohibited throughout the thread, to disable the forward kill operation for that thread regardless of whether processing of that thread has reached the portion comprising said at least one forward kill blocking instruction.

14. The apparatus according to claim 1, wherein the thread processing circuitry comprises shader circuitry to perform threads of fragment shading processing on the graphics fragments.

15. An apparatus for processing graphics primitives for display, comprising:
  means for generating graphics fragments corresponding to the graphics primitives;
  means for processing threads of processing corresponding to the graphics fragments; and
  means for triggering a forward kill operation to prevent the means for processing performing further processing of a target thread of processing corresponding to an earlier graphics fragment when the forward kill operation is enabled for the target thread and the earlier graphics fragment is determined to be obscured by one or more later graphics fragments;
  wherein in response to a given target thread including at least one forward kill blocking instruction having a property indicative that the forward kill operation should be disabled for the given target thread;
  when said thread processing circuitry has not yet reached a portion of the given target thread including said at least one forward kill blocking instruction, the means for processing is configured to enable the forward kill operation for the given target thread, where when the forward kill operation is enabled, if the means for triggering detects that the given target thread corresponds to an earlier graphics fragment that would be obscured in said display by one or more later graphics fragments, the means for processing is configured to terminate processing of the given target thread and;
  when said means for processing has reached the portion of the given target thread including said at least one forward kill blocking instruction, the means for processing is configured to disable the forward kill operation, where when the forward kill operation is disabled, if the means for triggering detects that the given target thread corresponds to an earlier graphics fragment that would be obscured in said display by one or more later graphics fragments, then the means for processing is configured to continue processing of the given target thread even though the earlier graphics fragment would be obscured in the display by the one or more later graphics fragments.

16. A method for processing graphics primitives for display, comprising:
  generating graphics fragments corresponding to the graphics primitives; and
  performing threads of processing corresponding to the graphics fragments; and
  triggering a forward kill operation to prevent further processing of a target thread of processing corresponding to an earlier graphics fragment when the forward kill operation is enabled for the target thread and the earlier graphics fragment is determined to be obscured by one or more later graphics fragments; and
  in response to a given target thread including at least one forward kill blocking instruction having a property indicative that the forward kill operation should be disabled for the given target thread:
    when processing of the given target thread has not yet reached a portion of the given target thread including said at least one forward kill blocking instruction, enabling the forward kill operation for the given target thread, where when the forward kill operation is enabled, if the given target thread is detected to correspond to an earlier graphics fragment that would be obscured in said display by one or more later graphics fragments, processing of the given target thread is terminated; and
    when processing of the given target thread has reached the portion of the given target thread including said at least one forward kid blocking instruction, disabling the forward kill operation, where when the forward kill operation is disabled, if the given target thread is detected to correspond to an earlier graphics fragment that would be obscured in said display by one or more later graphics fragments, then processing of the given target thread is continued e en though the earlier graphics fragment would be obscured in the display by the one or more later graphics fragments.

* * * * *